3,442,909
α-METHYL-β-(3,4-DISUBSTITUTEDPHENYL) PROPIONITRILES

Meyer Sletzinger, North Plainfield, N.J., assignor to Merck & Co., Inc., Rahway, N.J., a corporation of New Jersey
No Drawing. Filed Oct. 8, 1964, Ser. No. 402,632
Int. Cl. C07d *13/10;* C07c *121/50;* A61k *27/00*
U.S. Cl. 260—340.5
5 Claims

ABSTRACT OF THE DISCLOSURE

A group of compounds are described which generically are α-halo-α-methyl-β-(3,4-di-o-substitutedphenyl) propionitriles. These compounds are useful for the preparation of α-methyl-β-(3,4-dihydroxyphenyl)alanine and its derivatives which are known antihypertensive compounds.

---

This invention relates to processes and intermediates useful in the preparation of α-methyl-3,4-dihydroxyphenylalanines. More specifically, it relates to processes for the preparation of α-methyl-α-amino-β-(3,4-disubstitutedphenyl) propionitriles. Still more specifically, it is concerned with novel α-halopropionitriles formed as intermediates in the process of preparing the useful amino nitriles.

The α-methyl-α-amino-β-(3,4-disubstituted phenyl)propionitriles prepared in accordance with my invention are readily converted to the important therapeutic agent L-α-methyl-3,4-dihydroxyphenylalanine. This compound has found great utility in the treatment of hypertension in both mild and severe cases. Prior syntheses of α-methyl-3,4-dihydroxyphenylalanines which have been reported all utilize a 3,4-disubstituted benzyl methyl ketone as a starting material which, in turn, is synthesized from raw materials such as vanillin, piperonal, and the like. The present synthesis utilizes as starting materials the readily available 3,4-disubstituted anilines or the diazo compounds prepared from them. Such compounds may be converted easily in accordance with the present invention into the desired α-methyl-3,4-dihydroxyphenylalanines.

In accordance with my invention, the selected 3,4-disubstituted anilines, e.g., 3-methoxy-4-hydroxy aniline, 3,4-dihydroxy aniline, 3,4-dimethoxy aniline, 3,4-diethoxy aniline, 3,4-methylenedioxy aniline, and the like, are diazotized using sodium nitrite and a hydrohalic acid such as hydrochloric or hydrobromic acid to prepare the corresponding 3,4-disubstituted benzene diazonium halide. The diazonium halide is then contacted with at least one mol of methacrylonitrile per mol of diazo compound to form a novel α-methyl-α-halo-β-(3,4-disubstituted phenyl)propionitrile. The formed α-halopropionitrile is then readily converted to the known α-aminopropionitrile by treatment with ammonia. The compounds formed in this manner are then transformed by known methods to the desired α-methyl-3,4-dihydroxyphenylalanines. Thus, the aminonitriles prepared in accordance with my invention are hydrolyzed by treatment with a mineral acid to convert the cyano group to a carboxyl group. Neutralization of the acid addition salt formed as a result of this acid treatment results in the production of 3,4-disubstituted-α-methylphenylalanine. In the case of the phenylalanines containing substituents other than hydroxy substituents attached to the 3 and 4 positions of the phenyl ring, these substituents are converted into hydroxyl substituents by hydrolytic cleavage using concentrated hydrohalic acids.

In the first step of my process, a 3,4-disubstituted benzene diazonium halide having the formula:

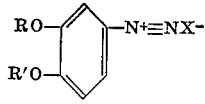

in which R and R' are hydrogen or alkyl substituents or, when taken together as a single substituent joining the oxygens, is a methylene substituent, and X is bromo or chloro, is contacted in solution with at least an equimolar amount of methacrylonitrile, thus effecting a substitution of the diazo group and forming a 3,4-disubstituted compound having the formula:

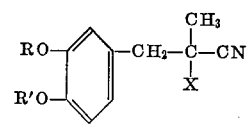

This substitution reaction is effected by bringing into contact in aqueous solution approximately equimolar amounts of the methacrylonitrile reagent and the selected benzene diazonium halide. The reaction is preferably carried out by adding a cooled (0–10° C.) solution of the benzene diazonium halide compound to a mixture of methacrylonitrile in water and a low molecular weight organic solvent. Examples of solvents which may be employed are lower aliphatic ketones such as acetone, diethyl ketone, methisopropyl ketone and methylisobutyl ketone; lower alkanols such as methanol, ethanol, propanol, isopropanol, N,N-dialkyl; alkanoyl amides such as dimethylformamide and dimethylacetamide, and the like.

The reaction is preferably carried out in the presence of a cuprous salt, the cuprous salt being selected so that the anion of the salt corresponds to the anion of the benzene diazonium halide employed. In carrying out the substitution reaction it is preferred to use approximately one mol of cuprous salt per mol of benzene diazonium halide and a temperature of about 25° C., although the reaction may conveniently be conducted at any temperature in the range of from about 10–100° C. The reaction is essentially complete when the evolution of nitrogen gas from the reaction mixture ceases. Following completion of the reaction, the entire reaction mixture is made acidic to about pH 2 and the formed product is extracted with a solvent which is immiscible with water. Suitable solvents are lower aliphatic ethers such as diethyl ether, diisopropyl ether, tetrahydrofuran, esters of lower aliphatic acids such as methyl acetate, propyl acetate, butyl acetate, methyl propionate, ethyl propionate, and the like. The extracts containing the product are concentrated under reduced pressure to remove the solvent and leave the product as an oily residue comprising the desired α-chloro-α-methyl-β-(3,4-disubstituted)propionitrile.

These novel products of my invention include α-chloro-α-methyl-β-(3-methoxy-4-hydroxyphenyl)propionitrile, α-chloro-α-methyl-β-(3,4-dimethoxyphenyl)propionitrile, α-chloro-α-methyl-β-(3.4-methylenedioxypheynl)propionitrile, α-chloro-α-methyl-β-(3,4-dihydroxyphenyl)propionitrile, α-bromo-α-methyl-β-(3-methoxy-4-hydroxyphenyl)propionitrile, α-bromo-α-methyl-β-(3,4-dimethoxyphenyl)propionitrile, α-bromo-α-methyl-β-(3,4-methylenedioxyphenyl)propionitrile, and α-bromo-α-methyl-β-(3,4-dihydroxyphenyl)propionitrile. The products produced in this manner may be crystallized or, alternatively, may be used directly in the next step of my process.

In the second step of my novel process, the formed α-halopropionitrile is contacted with ammonia to effect replacement of the α-halo substituent with an α-amino substituent. In carrying out this ammonolysis reaction, the α-halo compound is contacted with liquid ammonia or with a solution of ammonia in water. At least one mol of ammonia per mol of α-chloro compound is required to effect reaction, but it is preferred to use a molar excess of ammonia in order to ensure completion of the reaction. The ammonolysis reaction is effected readily and proceeds at room temperature on mixing the α-halo compound with the ammonia. After mixing the reagents, the reaction mixture is allowed to stand for a period of from about a few hours to several days in order to ensure completion of the reaction.

In the case of the reaction with liquid ammonia, the selected α-halopropionitrile is mixed with an excess of liquid ammonia and maintained at about room temperature for five days. The product is easily recovered by distilling off excess ammonia and crystallization of the residual material from isopropanol.

In an alternative procedure the ammonolysis reaction is carried out in aqueous solution. In this reaction the selected α-halopropionitrile is preferably added to a mixture of ammonium hydroxide, ammonium chloride and an alkali metal cyanide in a mixture of water and a lower alkanol at about 25° C. When the reaction is carried out in a mixture of isopropanol and water the product conveniently precipitates from the reaction mixture as it is formed and it is recovered by filtration and crystallized from isopropanol.

The ammonolysis reaction produces compounds having the formula:

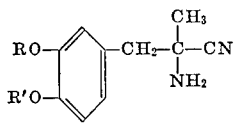

including α-amino-α-methyl-β-(3-methoxy - 4 - hydroxyphenyl)propionitrile, α-amino - α - methyl-β-(3,4-dimethoxyphenyl)propionitrile, α-amino-α-methyl-β-(3,4 - methylenedioxyphenyl)propionitrile, and α-amino-α-methyl-β-(3,4-dihydroxyphenyl)propionitrile.

The above-identified α-aminopropionitrile compounds may be converted to α-methyl-3,4-dihydroxyphenylalanine by hydrolysis of the nitrile substituent to a carboxylic acid substituent and conversion of the 3 and 4 alkoxy substituents to hydroxy substituents. Thus, for example, a selected α-amino-α-methyl - β - (3,4-disubstitutedphenyl)propionitrile is treated with fortified hydrochloric acid (concentrated hydrochloric acid saturated with hydrogen chloride) and heated at steam bath temperature for approximately 18 hours. The entire reaction mixture is then diluted with water and the pH of the solution adjusted to 6.5 with concentrated ammonium hydroxide. The resulting α-methyl-3,4-disubstituted phenylalanine crystallizes from solution and is recovered by filtration. The product obtained in this manner, using α-amino-α-methyl-β-(3.4-dihydroxyphenyl)propionitrile as starting material, is α-methyl - 3,4 - dihydroxyphenylalanine. The propionitrile compounds containing alkoxy substituents at the 3 and 4 positions are hydrolyzed to the corresponding disubstituted α-methylphenylalanines. These alkoxy-substituted compounds are treated with a refluxing 48% aqueous hydrobromic acid for a period of about 18 hours to cleave the ether substituents and yield α-methyl-3,4-dihydroxyphenylalanine as a product which may be crystallized from water.

In the case of α-amino-α-methyl-β-(3,4-methylenedioxyphenyl)propionic acid obtained as a product in the hydrolysis of the corresponding propionitrile, the desired product is obtained by treatment with a mixture of hydroiodic acid and red phosphorus under reflux for a period of about three hours. The product obtained after removal of the red phosphorus by filtration is the desired α-methyl-3,4-dihydroxyphenylalanine. The α-methyl - 3,4 - dihydroxyphenylalanine produced in this manner is in the racemic form. The active L-isomer may be obtained by the direct crystallization of the L-isomer from a supersaturated aqueous or aqueous-alcoholic solution of the racemate by seeding the supersaturated solution with crystals of the desired L-isomer.

EXAMPLE 1

α-Chloro-α-methyl-β-(3-methoxy-4-hydroxyphenyl)propionitrile

To a slurry of 70 grams of 3-methoxy-4-hydroxy-aniline in 100 ml. of concentrated hydrochloric acid at 0–5° C. is added a solution of 35 grams of sodium nitrite in 100 ml. of water to form the diazonium chloride salt. The solution of diazonium chloride is added slowly to a 25° C. mixture of 31 ml. of methacrylonitrile, 40 grams of sodium acetate, 15 grams of cuprous chloride in 250 ml. of acetone and 100 ml. of water. The solution is stirred until the evolution of nitrogen gas ceases. The product formed is isolated by adjusting the pH of the solution to pH 2 with hydrochloric acid and then extracting thoroughly with ether. The ether extract containing the α-chloropropionitrile product is dried and concentrated to give a dark oily residue comprising α-chloro-α-methyl-β-(3-methoxy-4-hydroxyphenyl)propionitrile. The crude product is isolated by crystallization or is utilized directly to form the corresponding α-amino compound.

In a similar manner, when equimolar amounts of 3,4-dihydroxy aniline, 3,4-dimethoxy aniline, 3,4-diethoxy aniline or 3,4-methylenedioxy aniline are used as the starting material in place of 3-methoxy-4-hydroxy aniline, the products formed are, respectively, α-chloro-α-methyl-β-(3,4-dihydroxyphenyl)propionitrile,
α-chloro-α-methyl-β-(3,4-dimethoxyphenyl)propionitrile,
α-chloro-α-methyl-β-(3,4-diethoxyphenyl)propionitrile, and
α-chloro-α-methyl-β-(3,4-methylenedioxyphenyl)propionitrile.

When the above procedures are repeated using concentrated hydrobromic acid instead of concentrated hydrochloric acid to form the corresponding diazonium bromide, the identical products are obtained.

EXAMPLE 2

α-Amino-α-methyl-β-(3-methoxy-4-hydroxyphenyl)propionitrile

Approximately 10 grams of α-chloro-α-methyl-β-(3-methoxy-4-hydroxy)propionitrile is mixed with 50 ml. of liquid ammonia and the solution maintained at 25° C. for approximately five days. The excess ammonia is then allowed to evaporate from the reaction mixture and the residue comprising the product is dissolved in warm isopropanol, the solution filtered to remove insoluble impurities and then cooled to 0–5° C. for a period of about 18 hours and seeded with crystals of the desired product. The α - amino-α-methyl-β-(3-methoxy-4-hydroxyphenyl)propionitrile crystallizes from solution in substantially pure form. M.P. 122–125° C.

Repetition of this procedure utilizing as starting materials in place of α-chloro-α-methyl-β-(3-methoxy-4-hydroxyphenyl)propionitrile the products obtained in accordance with the second paragraph of Example 1, results in the production of α-amino-α-methyl-β-(3,4-dimethoxyphenyl)propionitrile,
α-amino-α-methyl-β-(3,4-diethoxyphenyl)propionitrile,
α-amino-α-methyl-β-(3,4-methylenedioxyphenyl)propionitrile, and
α-amino-α-methyl-β-(3,4-dioxyphenyl)propionitrile.

EXAMPLE 3

α-Amino-α-methyl-β-(3-methoxy-4-hydroxyphenyl)propionitrile (alternate procedure)

Approximately 10 grams of α-cloro-α-methyl-β-(3-methoxy-4-hydroxyphenyl)propionitrile is added to a mixture of 2.8 grams of sodium cyanide, 3.18 grams of ammonium chloride and 4 ml. of concentrated ammonium hydroxide in 7 ml. of water and 5 ml. of isopropanol and is stirred for about 18 hours. The resulting α-amino-α-methyl-β-(3-methoxy-4-hydroxyphenyl)propionitrile precipitates from solution and is recovered by filtration and is washed successively with cold water and isopropanol. Crystallization of the crude product from isopropanol gives substantially pure material. M.P. 124–126° C.

What is claimed is:
1. The process which comprises contacting a compound of the formula:

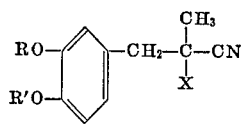

with ammonia to form an α-aminopropionitrile of the formula:

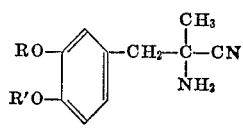

wherein R and R' are selected from the group consisting of hydrogen and lower alkyl substituents and, when taken together are a single methylene substituent, and X is a halo substituent selected from the group consisting of chloro and bromo.

2. A compound of the formula:

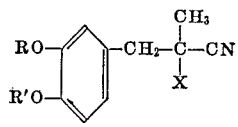

wherein R and R' are selected from the group consisting of hydrogen and lower alkyl substituents and, when taken together are a single methylene substituent, and X is a halo substituent selected from the group consisting of chloro and bromo.

3. α - Methyl-α-chloro-β-(3-methoxy-4-hydroxyphenyl)propionitrile.
4. α - Methyl - α-chloro-β-(3,4-dimethoxyphenyl)propionitrile.
5. α - Methyl - α - chloro-β-(3,4-methylenedioxyphenyl)propionitrile.

References Cited

FOREIGN PATENTS 611,593  11/1948  Great Britain.

ALEX MAZEL, *Primary Examiner.*

JAMES H. TURNIPSEED, *Assistant Examiner.*

U.S. Cl. X.R.

260—465, 999